United States Patent [19]

Krajewski

[11] 4,289,675

[45] Sep. 15, 1981

[54] AIR DRYING LATEX COATING COMPOSITION CURABLE UNDER AMBIENT CONDITIONS AND METHOD OF PROVIDING SAME

[75] Inventor: John J. Krajewski, Wheeling, Ill.

[73] Assignee: DeSoto, Inc., Des Plaines, Ill.

[21] Appl. No.: 99,568

[22] Filed: Dec. 3, 1979

[51] Int. Cl.$^3$ ............... C08L 29/04; C08L 31/00; C08L 33/24

[52] U.S. Cl. ............ 260/29.6 CM; 260/29.6 AT; 260/29.6 TA; 260/29.6 H; 428/500; 428/501; 525/277; 525/282; 525/296

[58] Field of Search ............ 260/29.6 CM, 29.6 AT, 260/29.6 TA, 29.6 H; 525/277, 282, 296

[56] References Cited

U.S. PATENT DOCUMENTS 3,635,835  1/1972  Peterson ............... 260/29.6 CM

Primary Examiner—Harold D. Anderson
Attorney, Agent, or Firm—Dressler, Goldsmith, Shore, Sutker & Milnamow, Ltd.

[57] ABSTRACT

An air drying latex coating composition, curable under ambient conditions, is described having copolymer particles consisting essentially of copolymerized monoethylenically unsaturated monomers dispersed in an aqueous emulsion. The copolymer particles have 0.5–30% by weight of ethylenically unsaturated monomers bonded thereto through reacted $C_1$–$C_6$ N-alkylol functionalities. Curing agents or curing catalysts are also present to cure the deposited composition. The coating compositions are provided by forming an aqueous dispersion of the copolymer particles, bonding an ethylenically unsaturated monomer thereto through a $C_1$–$C_6$ N-alkylol functionality, and admixing therein a curing catalyst or curing agent.

23 Claims, No Drawings

AIR DRYING LATEX COATING COMPOSITION CURABLE UNDER AMBIENT CONDITIONS AND METHOD OF PROVIDING SAME

DESCRIPTION

1. Technical Field

This invention relates to aqueous latex coating compositions which dry in air and which cure under ambient conditions, such as by exposure to ultraviolet light or air, to improve the solvent resistance, scrub resistance, and other properties of the coatings.

2. Background Art

Aqueous latex coating compositions, both clear and pigmented, are in wide use, the latex particles being provided by aqueous emulsion copolymerization of monoethylenically unsaturated monomers. These copolymers are generally thermoplastic from the standpoint that the deposited and air dried coatings dissolve easily in organic solvents, such as methyl ethyl ketone. When monomers providing cure capacity are present, the cure frequently requires a bake, and this largely limits curable coatings to industrial situations where baking capacity is available. When polyethylenically unsaturated monomers are included in the monomer mixture in the hope of obtaining residual unsaturation for subsequent cure after application, it is difficult to avoid premature consumption of all of the unsaturation which it is intended to preserve for ultimate cure. This impairs the capacity of the latex particles to coalesce and adhere to the coated substrate.

The use of drying agents to air cure unsaturated resins is known, but this usually involves combinations of alkyd resins with driers, normally in organic solvent solution. A coworker, S. G. Mylonakis, in application Ser. No. 901,856 filed May 1, 1978, incorporated a reactive group in the copolymer particles in an aqueous latex and then added an unsaturated monomer which would react with this reactive group to provide unsaturated groups on the copolymer particles in the latex. The only reactive groups specifically described are carboxyl and 1,2-epoxy, and this normally requires that glycidyl methacrylate be used. This monomer is toxic, and while the toxicity is probably eliminated by copolymerization or esterification, the possibility of undesired toxicity introduces a detrimental factor. Unfortunately, the practical elimination of epoxy-functional monomer is not at all self-evident.

In said application Ser. No. 901,856, a photosensitizer, such as benzophenone, is incorporated in the latex, preferably into the copolymer particles themselves, and this enables an ultraviolet cure. However, it is preferred to omit the photosensitizer and the need for light of short wave length, and this was done by incorporating drier salts in a separate emulsion phase using water immiscible organic solvent as disclosed in Mylonakis' Application Ser. No. 007,516 filed Jan. 29, 1979.

This invention is concerned with providing latex paints which cure under ambient conditions similar to those developed by Mylonakis, but which do not involve the use of epoxy-functional monomers.

DISCLOSURE OF INVENTION

According to the present invention, an air drying latex coating composition which cures under ambient conditions is provided in which water has dispersed therein emulsion copolymer particles consisting essentially of copolymerized monoethylenically unsaturated monomers. The copolymer particles in the latex carry ethylenically unsaturated groups provided by the reaction of reactive groups in the copolymer particles with a reactive, ethylenically unsaturated monomer bonded thereto through a reacted $C_1$–$C_6$ N-alkylol functionality. The unsaturated monomer which is bonded to the copolymer particles comprises about 0.5% to about 30% by weight of the solids of the copolymer. The dispersed copolymer has a $T_g$ below 20° C., preferably in the range of about 15° C. to about −40° C., and usually from about 5° C. to about −20° C. Also there will be present in the latex either a curing catalyst or a curing agent which will cause the unsaturation carried by the copolymer particles to react in the deposited coating to cure the same during or after drying.

Another way of defining the aqueous dispersion or latex structure is to note that the copolymer particles in the latex have bonded thereto a plurality of groups having the formula

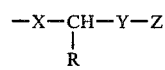

wherein

X and Y are selected from —O— or

at least one of X and Y being

and most preferably both X and Y being —NH—;

R is hydrogen or $C_1$–$C_5$ alkyl; and

Z is the residue of an ethylenically unsaturated monomer having a single reactive group other than the ethylenic unsaturation. The Y and Z groups together comprise about 0.5% to about 30% by weight of the copolymer solids.

The coating compositions of this invention are formed by copolymerizing monoethylenically unsaturated monomers in aqueous emulsion to produce a latex in which the copolymer particles contain reactive groups. These reactive groups may be carried by one or more of the monomers which are copolymerized to form the latex, or a water insoluble oily plasticizer carrying the reactive groups may be incorporated into the copolymer particles, as by being present during the copolymerization. The proportion of the reactive groups is desirably minimized but they should be present in a stoichiometric excess with respect to the subsequently added reactive ethylenically unsaturated monomer which is bonded to the copolymer particle by reaction with these reactive groups utilizing a reaction involving $C_1$–$C_6$ N-alkylol functionality.

The copolymer particles are provided by aqueous emulsion copolymerization, and at least about 60% by weight of the copolymer is constituted by nonreactive monoethylenically unsaturated monomers. The term "nonreactive" is used herein to denote the incapacity for reaction of these monomers under the conditions of polymerization, reaction, and later cure, except to polymerize by their single ethylenic group. Nonreactive monomers are necessary to minimize the ultimate crosslink density.

The usual nonreactive monomers which constitute the principal amount of the dispersed, coalescable copolymer contain a single ethylenic group and no other functional group. Illustrative monomers are ethyl acrylate, butyl acrylate, methyl methacrylate, vinyl acetate, and ethylene. Illustrative copolymers are also illustrated in the examples hereinbelow, and in the patent applications referred to hereinabove.

It is essential that there be a plurality of reactive groups in the copolymer particles in the latex to enable the subsequent bonding of the copolymer particles to a plurality of monomers having reactive ethylenic unsaturation. The reactive groups are preferably provided by the presence in the copolymer of copolymerized monomer which carries the reactive group. As used herein, the term "reactive group" is used to denote those functionalities which will react after copolymerization with an N-alkylol functionality and also to the N-alkylol functional group itself.

Reactive functional groups which will react with an N-alkylol functionality are illustrated by hydroxyl groups of alcohols, carboxylic acids, oximes, hydroxomic acids and the like, amide groups having at least one amido hydrogen atom, including hydroxamic acids, semicarbazones, and also hydrazones having at least one hydrogen atom on the singly bonded nitrogen atom.

Monomers bearing alcoholic hydroxyl reactive groups which may be copolymerized to form part of the copolymer include hydroxyl-functional $C_2-C_4$ alkyl acrylates, methacrylates and crotonates such as hydroxyethyl acrylate, 2-hydroxypropyl methacrylate and 3-hydroxypropyl crotonate. Reactive carboxylic acid monomers which may form part of the copolymer include acrylic acid, methacrylic acid, crotonic acid, maleic acid, fumaric acid and the like. Amide monomers which will react with N-alkylol functionalities after copolymerization and which have at least one amido hydrogen atom include N-methyl acrylamide, methacrylamide, N-propyl crotonamide, maleamic acid, maleimide, allyl carbamate, and the like. Using copolymerized methacrylamide as illustrative, the amido nitrogen provides the X group of the above structural formula.

Copolymers bearing the oxime, semicarbazone, hydrazone and hydroxamic acid reactive groups are usually best prepared by copolymerization followed by a subsequent reaction to introduce these reactive groups. When the reactive groups are added after copolymerization, these groups may still be considered to be carried by the copolymerized monomers.

Thus, monoethylenically unsaturated monomers containing aldehyde and ketone groups such as acrolein, methyl vinyl ketone and ethyl vinyl ketone may be copolymerized to form part of the copolymer particles. The copolymer particles may then be reacted with hydroxylamine, semicarbazide or hydrazine, as is well known in the art, to form oxime, semicarbazone or hydrazone reactive groups, respectively, on the copolymer. When a hydrazone is to be formed, it is most preferred that the hydrazine be unsubstituted, but if a substituted hydrazine is used, it should be a mono-substituted hydrazine, such as N-methyl hydrazine, so that the resulting hydrazone has at least one hydrogen atom on the singly bonded nitrogen atom ($=N-NH-$).

Hydroxylamine and its mono-substituted $C_1-C_4$ alkyl derivatives such as N-methyl hydroxylamine or O-ethyl hydroxylamine may be reacted with copolymers having ester groups, such as copolymerized methyl methacrylate or ethyl acrylate, to form hydroxamic acids. For example, hydroxylamine may be reacted with copolymerized ethyl acrylate to yield copolymerized acrylic hydroxamic acid.

The ethylenic unsaturation is provided by the reaction of the dispersed, coalescable polymer particles with an ethylenically unsaturated monomer containing a single reactive group which becomes bonded to the copolymer particles through a reacted $C_1-C_6$ N-alkylol functionality. This $C_1-C_6$ N-alkylol functionality may be provided by means of an ethylenically unsaturated monomer which is copolymerized into the copolymer particles in the latex, it may be provided by a $C_1-C_6$ N-alkylol ethylenically unsaturated monomer which is added to the latex for reaction with a reactive group in the copolymer particle, or it may be provided by reaction in situ between a reactive group in the copolymer particle with a $C_1-C_6$ aldehyde, preferably formaldehyde, whereupon the N-methylol functionality so generated can be reacted with a reactive group carried by an ethylenically unsaturated monomer added to the latex. Of course, mixtures of these modes of production may also be used.

The desired "N-alkylol functionality" is conveniently obtained by the reaction of a $C_1-C_6$ aldehyde with the nitrogen atom of an amide functional group having at least one amido hydrogen atom to yield the —CO—=ON(CHROH)— group, wherein R is hydrogen or $C_1-C_5$ alkyl. While aldehydes such as acetaldehyde, propionaldehyde, butyraldehyde and the like may be used, formaldehyde is preferred and will be used as illustrative.

When an N-methylol functional monomer is used as the reactive group of the copolymer, that monomer is preferably a $C_2-C_8$ saturated alcohol ether of a monoethylenically unsaturated N-methylol functional monomer. This is because, in normal practice, only a portion of the N-methylol functionality in the copolymer will be consumed on subsequent reaction with an unsaturated monomer, and the unconsumed N-methylol functionality is more stable when it is etherified. These monomers include N-methylol substituted acrylamide, methacrylamide, crotonamide, maleimide, allyl carbamate and the like.

The isobutoxy ethers are preferred ether groups carried on the N-methylol functionality when the N-methylol functionality is part of the copolymer. Thus, the most preferred monomers for providing N-methylol functionality in the dispersed copolymer include N-isobutoxymethyl acrylamide, N-isobutoxymethyl allyl carbamate, N-isobutoxymethyl methacrylamide, N-isobutoxymethyl crotonamide, and N-isobutoxymethyl maleimide; N-isobutoxymethyl acrylamide and N-isobutoxymethyl methacrylamide being especially preferred.

Reactive groups may also be incorporated into the copolymer particles by means of a reactive plasticizer which is contained within the copolymer particles. This result is conveniently accomplished by pre-emulsifying into the water in which copolymerization is to take place, a minor amount (about 1% to about 30%, preferably about 2% to about 10% by the weight of the copolymer) of a water insoluble liquid plasticizer which will imbibe the monomers being copolymerized as they are incrementally added to the emulsion.

The preferred plasticizers are polyhydric polyols, e.g., polyalkylene oxide ethers of polyhydric alcohols such as glycerin, trimethylolpropane, pentaerythritol, hexanetriol bisphenol A, and the like. Propylene oxide is especially preferred because it confers water insolubility at a lower molecular weight, but ethylene oxide can also be used at higher molecular weight, or when pentaerythritol is selected. Examples of these preferred polyhydric plasticizers include a propylene oxide adduct of trimethylolpropane having a molecular weight of about 600, a propylene oxide adduct of glycerin having a molecular weight of about 3300, an ethylene oxide adduct of pentaerythritol having a molecular weight of about 550, an ethylene oxide adduct of trimethylolpropane having a molecular weight of a about 2400, and the like.

The plasticizer may also carry reactive —C═OOH and —C═ONH— groups, as may be found in the dimerized linoleic acid known as dimer acid, and its diamide. Similarly, the plasticizer may carry a reactive hydrazone (═N—NH—), oxime (═NOH) or semicarbazone (═N—NHC═ONH—) group. These plasticizers may be formed by the reaction of hydrazine, hydroxylamine or semicarbazide, respectfully, with an aliphatic aldehyde or ketone having about 12-20 carbon atoms. Illustrative examples of these plasticizers include dodecanal hydrazone, 2-octadecanone oxime and dodacanal semizarbazone.

In addition, plasticizers having about 12-20 carbon atoms and reactive hydroxamic acid or N-or O-substituted hydroxamic acid groups may be employed. The hydroxamic acid, N-substituted hydroxamic acid and O-substituted hydroxamic acid reactive groups may be designated by the formula —C═ONA—OB, wherein A and B are hydrogen or $C_1$-$C_4$ alkyl, at least one of A or B being hydrogen. Examples of this group of plasticizers include lauric hydroxamic acid, N-methyl stearic hydroxamic acid and O-ethyl myristic hydroxamic acid.

It is desired to point out that one or more of the reactive groups noted above will be present in the copolymer particles and, after copolymerization to form the latex has been completed, a monomer having ethylenic unsaturation and carrying a single reactive group is added to the latex. The reactive group of the added unsaturated monomer is then reacted with the reactive group in the copolymer particles in a reaction involving $C_1$-$C_6$ alkylol functionality to bond the unsaturated monomer to the copolymer particles. The added unsaturated monomer should be in stoichiometric deficiency since it is desired to substantially completely consume the added monomer by the reaction of the reactive groups without destroying the ethylenic unsaturation.

While it is not of prime importance whether the N-methylol (N-alkylol) reactive group is present in (1) the copolymer particles, (2) the added monomer or (3) is formed in situ, the origin of the N-methylol functionality does play a role in whether the N-methylol group is blocked with an ether group or not, and if blocked, by which ether. Thus, as already noted, when the N-methylol functionality is present as part of the copolymer particle, it is preferably blocked by an isobutoxy ether group. However, when the N-methylol functionality is part of the added monomer, it may be unblocked, as in N-methylol acrylamide, or it may be blocked with an easily removable blocking group such as a methoxy ether, as exemplified by N-methoxymethyl methacrylamide. When the N-methylol functionality is formed in situ, the presence of a blocking ether group is not desired.

Using copolymer particles containing copolymerized N-isobutoxymethyl acrylamide as exemplary, ethylenically unsaturated groups may be reacted onto the copolymer particles by adding to the latex an ethylenically unsaturated monomer having a reactive —C═ONH— (amide), alcoholic —OH (hydroxyl) or —C═OOH (carboxyl) functionality. Examples of suitable monomers include acrylamide, methacrylamide, N-methyl crotonamide, allyl carbamate and maleimide, hydroxyalkyl esters of ethylenically unsaturated carboxylic acids in which the alkylene group contains 2-4 carbon atoms, such as hydroxyethyl methacrylate and acrylate, and 2-hydroxypropyl methacrylate and acrylate, 4-hydroxybutyl crotonate and the like, as well as carboxylic acids such as acrylic or methacrylic acids. Additionally, ethylenically unsaturated groups may be reacted onto the copolymer particles by reacting $C_{10}$-$C_{20}$ ethylenically unsaturated monomers such as oleyl alcohol, soya fatty acids, linoleamide or the like. When an ethylenically unsaturated amide reactive monomer is used, it is preferred that the amide nitrogen be unsubstituted; i.e., having two amido hydrogen atoms (—C═ONH$_2$) such as acrylamide or methacrylamide.

These ethylenically unsaturated groups, together with any linking group, comprise the Z group of the formula shown above. Thus, the Z group for hydroxyethyl methacrylate, which has a —CH$_2$—CH$_2$—O— linking group is —CH$_2$—CH$_2$—OO═C—C(CH$_3$)═CH$_2$. The Z group preferably contains an acryloyl or methacryloyl residue.

As stated above, the Y group may be —O— or —N—. Using acrylamide as illustrative of an ethylenically unsaturated monomer which may be bonded to the copolymer particles through a reacted $C_1$-$C_6$ N-alkylol functionality, the amido nitrogen comprises the Y group of the above formula, while the acryloyl residue comprises the Z group.

The monomer is added in stoichiometric deficiency to an aqueous latex containing copolymer particles containing a minor proportion of the exemplary, copolymerized N-isobutoxymethyl acrylamide. The reaction takes place slowly to consume some of the N-methylol functionality (N-isobutoxy-methyl) to provide copolymer particles having pendant, ethylenic unsaturation. It is convenient to carry out the reaction after completion of the emulsion polymerization which produced the latex.

Polyethylenically unsaturated reactive monomers, such as those carrying an alcoholic hydroxyl group, are also contemplated as being reacted with the N-isobutoxymethyl functionality of the copolymer. Thus, ethylenically unsaturated polyesters of glycerin, trimethylolpropane, hexanetriol and the like, such as glyceryl diacrylate and trimethylolpropane dimethacrylate are contemplated as supplying ethylenic unsaturation to the composition by reaction of the free alcoholic —OH functionality with the N-methylol functional copolymer. This illustrates the fact that the ethylenically unsaturated monomer which is used to introduce unsaturated groups into the copolymer particles should contain a single reactive functional group, but it can contain one or several ethylenically unsaturated groups. Pentaerythritol triacrylate will further illustrate this concept.

It is particularly preferred to employ copolymer particles containing reactive functionalities, as described hereinabove, which will react with ethylenically unsaturated N-methylol functional monomers (but not with themselves) to thereby provide the desired pendant, curable ethylenic unsaturation. N-methoxymethyl amides and N-methylol amides of acrylic acid, methacrylic acid, crotonic acid, allyl carbonic acid, and the N-methoxymethyl imides and N-methylol imides of maleic acid are preferred unsaturated monomers for admixture with and reaction with copolymer particles containing reactive functionalities to provide pendant, ethylenic unsaturation to the coating composition.

The N-methylol amides of acrylic acid and methacrylic acid are particularly preferred monomers for introducing ethylenic unsaturation when the copolymer particles in the latex contain a reactive group selected from —C=ONH—, —C=OOH, alcoholic —OH, =NOH, =N—NH—, =N—NHC=ONH— and —C=ONA—OB, wherein A and B are hereinabove defined, functionalities. The presence of carboxylic acid functionality in the copolymer particle alone or in addition to the other reactive groups present is preferred as the reaction between the reactive groups and the N-methylol functionality is acid catalyzed.

Ethylenic unsaturation may also be provided by the reaction of the copolymer particles with an added ethylenically unsaturated monomer through an N-methylol functionality formed in situ. The N-methylol functionality may be generated in situ by the reaction of formaldehyde with a functional group from the copolymer particles or admixed monomer when the reacting functional group of either reactant is —C=ONH—. The functional group of the other reactant may be a group selected from —C=ONH—, —C=OOH, alcoholic —OH, =NOH, =N—NH—, =N—NHC=ONH— and —C=ONA—OB. It is preferred that the functional groups of both the dispersed copolymer particle and the admixed ethylenically unsaturated monomer be —C=ONH— (amide), while in most preferred practice, both of these functional groups are —C=ONH$_2$ (unsubstituted amide), thereby providing the most preferred X and Y groups (—NH—) of the above formula. Thus, in most preferred practice the dispersed copolymer may be comprised of copolymerized acrylamide, methacrylamide, crotonamide, maleimide, allyl carbamate, and the like, as stated hereinabove.

When the N-methylol functionality is provided by reaction in situ, it is preferred that the formaldehyde be first adducted to dispersed copolymer particles containing the amide group to form the N-methylol moiety; i.e. that the copolymer particles contain a reactive —C=ONH— group. The formaldehyde may be supplied to the dispersion in various ways, as by means of gaseous formaldehyde, a formaldehyde solution in water or butanol, or as paraformaldehyde (polyoxymethylene.)

The ethylenically unsaturated monomer bonded to the copolymer particles through a reacted N-methylol (or N-alkylol) functionality and providing pendent, ethylenic unsaturation to the latex is present at about 0.5% to about 30% by weight of the solids of the copolymer. In determining this weight amount, only the portion of the added monomer including the atom which bonds to the methylene group of the N-methylol functionality is counted (the Y and Z groups of the above formula). Thus, when an amide, such as acrylamide, is the added monomer supplying ethylenic unsaturation, the weight per mole of added monomer is 70. Similarly, when N-methoxymethyl acrylamide is the added monomer, 70 is also used as the weight per mole of added monomer.

The term "air drying" means that the copolymer particles in the latex coalesce at normal room temperature when the latex is filmed on a support or substrate and allowed to dry. This is normally controlled by adjusting the glass transition temperature of the copolymer (Tg). $T_g$ is usually calculated from the known properties of homopolymers produced from the monomer components. The $T_g$ of the copolymers of interest herein is desirably below 20° C., more usually from about 5° C. to −20° C.

The reaction of the copolymer with the unsaturated monomer does not materially change the $T_g$ of the copolymer because the reaction simply generates side chains. Some premature chain extension or cross-linking may occur and this increases the $T_g$, but very little occurs in preferred practice. Also, small amounts of high boiling solvents can be used to effectively reduce the $T_g$ to promote air drying, as is well known.

Aqueous emulsion copolymerization is itself well known and described in the patent applications noted earlier, as well as in the examples set out hereinbelow. This polymerization is carried out in usual fashion in the absence of the monomer providing ethylenic unsaturation to the product, such monomer being incorporated by a post reaction with reactive groups in the emulsified copolymer particles.

When preparing the copolymer, sufficient amounts of reactive functionalities are provided to assure reaction of the added ethylenically unsaturated monomer with the dispersed copolymer particles. It is preferred that there be a stoichiometric excess of reactable copolymer particle functionality over added monomer functionality to help assure that the adder monomer reacts with the copolymer particles rather than with itself, and that the monomer-copolymer particle reaction goes as far toward completion as possible.

The linking reaction between the N-methylol group (whether free, blocked or formed in situ) and the above described reactive groups, such as —C=ONH—, C=OOH or alcoholic —OH functionalities, is well-known in the art. It proceeds at temperatures below 100° C. and is preferably carried out in an organic solvent, such as the oil phase of the latex. This reaction is also catalyzed by acids such as the carboxylic acids which may be present in the dispersed copolymer, or by other acids, such as hydrochloric acid, non-toxic organic acids like acetic acid, propionic acid and the like which may be added to the dispersion after it is formed or which may be present during copolymerization. Non-toxic organic acids such as acetic acid are preferred added acids. The acids may be neutralized after the reaction which they catalyze has been completed.

In usual practice, the dispersed copolymer is prepared at an elevated temperature in a batch-type process. After copolymerization, the hot copolymer particle dispersion (latex) is allowed to cool, either in the reaction vessel or in a separate holding tank, prior to its being manipulated further. In preferred practice of this invention, the ethylenically unsaturated monomer is added to the latex and reacted with the copolymer particles after the completion of copolymerization and any subsequent reactive group introducing reaction, and prior to allowing the dispersing to cool to ambient temperature. This saves having to raise the dispersion temperature substantially from ambient in order for the subsequent monomer adding reaction to take place.

The reaction through the N-methylol functionality is both time and temperature dependent with reactions at lower temperatures requiring more time to go to completion than those reactions carried out at higher temperatures. Thus, it is permissible for the reaction to be completed slowly at room temperature.

A free radical polymerization inhibitor, such as benzoquinone or hydroquinone, may be added to the copolymer dispersion along with the ethylenically unsaturated monomer to minimize premature consumption of this unsaturation. These inhibitors are well-known.

The coating compositions of this invention are cured during or after air drying on the substrate by the incorporation of a curing catalyst or curing agent into the latex. A curing catalyst is illustrated by a ketonic photosensitizer such as benzophenone. Since light of short wave length is required in addition to the catalyst, the photosensitizer is preferably incorporated in the monomers so as to be present in the emulsion copolymer particles.

Drier salts are preferred for the cure of pigmented systems. Since the presence of drier salts in the copolymer particles is difficult to achieve without introducing some premature cure, they are separated from the copolymer particles by dissolving them in a water immiscible organic solvent and separately emulsifying them in the aqueous continuum of the latex.

Other curing agents, such as oily amines having a plurality of amine hydrogen atoms, can be employed by separate emulsification, either per se, or with the aid of water immiscible organic solvent. If the amine is protected by neutralization with a volatile solubilizing acid, such as acetic acid or carbonic acid, then the amine curing agent may be dissolved in the aqueous continuum of the latex.

Pigment suspensions can be mixed in as desired, and as is customary in the provision of emulsion paints, without disturbing the cure capacity of the latex coating. The drier emulsion can be added to the copolymer dispersion before or after pigmentation.

In addition to those monomers discussed hereinabove which may constitute the copolymer, diverse monomers may also be present in the copolymer in amounts for special purposes. Thus, the copolymer may include up to about 3% of its weight of monomers known to improve adhesion of the coating to its substrate. These monomers are illustrated in U.S. Pat. Nos. 3,356,653; 3,356,654; 3,356,655; and 3,509,085. The alcoholic hydroxyl functional polyethylenically unsaturated polyesters taught in U.S. Pat. No. 4,132,688 may also be included at about 2% to about 12%, and preferably at about 4% to about 10% by weight of the copolymer as a "monomer" thereof. It is understood that when these polyethylenically unsaturated polyesters are used in the copolymers of this invention, they must not gel the copolymers and this is described in U.S. Pat. No. 4,132,688.

In addition, up to about 3% by weight of the copolymer may be comprised of amino functional monomers which assist the stabilization of the dispersion when at least some of the amino groups are protonated. Preferably, these amino functional monomers are tertiary amines such as N-(dimethylamino)ethyl methacrylamide or N-(diethylamino)ethyl acrylate. Use of copolymers comprised of amino functional monomers which are neutralized to provide an acidic environment also assists in providing acid catalysis for the reaction in which unsaturated monomers are bonded to the copolymer particles via the N-alkylol group.

BEST MODES FOR CARRYING OUT THE INVENTION

Example 1

Air Drying Outdoor Coating

| Grams | |
|---|---|
| | Monomer Emulsion |
| 25.64 | Butyl acrylate |
| 17.25 | Methyl methacrylate |
| 2.80 | 2-hydroxyethyl methacrylate |
| 0.93 | Methacrylic acid |
| 2.23 | Sodium dodecyl benzene sulfonate (23% in water) [The sulfonate solution is the surfactant. Siponate DS-4 (23%) supplied by Alcolac Incorporated may be used] |
| 12.67 | Deionized water |
| | Kettle Charge |
| 30.31 | Deionized water |
| 0.31 | Sodium dodecyl benzene sulfonate (23% in water) |
| 0.05 | Sodium bicarbonate |
| 2.59 | Monomer Emulsion |
| 0.19 | Sodium persulfate |
| 1.29 | Deionized water |
| | Initiator Solution |
| 0.01 | Sodium formaldehyde sulfoxylate |
| 0.13 | Ferrous sulfate (0.15%) |
| | Unsaturated Monomer Solution |
| 0.05 | Hydroquinone |
| 0.50 | N-methylol acrylamide |

The monomer emulsion is premixed so that a small proportion thereof can be added to the kettle charge. The kettle charge is provided by adding 30.31 grams of deionized water to a five liter four nect flask and heating to 80° C. The remaining materials in the kettle charge are then added and the initiator solution is added dropwise until an exotherm is noted. The temperature of 80° C. is maintained for 30 minutes. The remaining monomer emulsion is then added and the emulsion is maintained at 80° C. for 2.5 hours.

To ensure completion of the reaction, the reaction temperature is maintained at 80° C. and portions of the initiator solution are added twice followed by maintaining the temperature for 30 minutes in each instance.

The reaction with N-methylol acrylamide may be carried out in the presence of light since, in the absence of photosensitizer very little cross-linking takes place, but the flask can be shielded against ultraviolet light of desired. The mixture of hydroquinone and N-methylol acrylamide is added and the reaction mixture is held for 2 hours at 80° C. The flask is then allowed to cool and the emulsion filtered through a 100 mesh screen.

Example 2

Air Curing Outdoor Coating

| Grams | Component |
|---|---|
| 100 | Latex of Example 1, 50% solids |
| 1.5 | Nonyl phenoxy poly(ethyleneoxy) ethanol [9 moles of ethylene oxide per mol of phenol] GAF Corporation product Igepal CO-630 may be used |
| 1.0 | Cobalt napthenate drier (6% solution in mineral spirits) |
| 1.0 | Manganese naphthenate drier (6% solution in mineral spirits) |
| 0.5 | Zirconium naphthenate drier (12% |

-continued

| Grams | Component |
|---|---|
|  | solution in mineral spirits) |

Using an overhead stirrer with low speed, 100 grams of the latex are mixed slowly with the driers which have previously been thoroughly mixed with the nonionic surfactant. Mixing is continued for approximately 30 minutes. The resulting mixture is then drawn down on aluminum and paper substrates to provide a dry thickness of from one to two mils. The applied films are air dried for a period of 30 days. The water resistance, hardness and adhesion gradually improve with time.

Example 3

Pigmented Air Curing Outdoor Coatings

| Grams | Component |
|---|---|
| 87.9 | Deionized water |
| 202.9 | Titanium dioxide, rutile |
| 8.9 | Sodium salt of polymalonic acid (25% water solution) as a dispersing agent. The commercial dispersing agent Tamol 731 of Rohm and Haas may be used if desired. |
| 8.9 | Octyl phenoxy poly(ethyleneoxy) ethanol [10 moles of ethylene oxide per mol of phenol] The commercial nonionic surfactant Triton X100 of Rohm and Haas may be used if desired. |
| 0.9 | Silica hydrophobe defoaming agent. The product Drew L475 of Drew Chemical Company may be used if desired. |

The above components are mixed at low speed with an overhead stirrer to provide a pigment dispersion to which is added, with low speed mixing, the following emulsion.

| Grams | Component |
|---|---|
| 3.5 | Nonionic surfactant in Example 2 |
| 4.0 | Cobalt drier in Example 2 |
| 4.0 | Manganese drier in Example 2 |
| 2.0 | Zirconium drier in Example 2 |
| 416.6 | Latex of Example 1 |
| 0.5 | Defoaming agent in Example 2 |
| 151.1 | Deionized water |

The above emulsion may desirably be thickened. An appropriate cellulosic thickener which may be used is hydroxyethyl cellulose. The commercial thickener 250 MHBR of Hercules is useful.

The resulting paint air dries in less than about 10 minutes and air cures within about one week.

Example 4

Light Curing Outdoor Coating

An aqueous emulsion copolymer composition at about 50 weight percent solids is prepared as described in Example 1 containing ethyl acrylate and methyl methacrylate at a 2 to 1 (weight to weight) ratio along with 1% by weight acrylic acid and 5% by weight acrylamide as the monomer emulsion, the weights being based upon the total weight of monomers. A small amount of this emulsion is charged into a reaction kettle along with sodium persulfate, deionized water and the remaining amount of emulsifying surfactant to be used. Benzophenone, at 3% by weight of the total monomer weight, is then admixed to the remaining, uncharged monomer emulsion.

The copolymerization is initiated and carried out as described in Example 1 with the exception that benzophenone is added along with the previously uncharged monomer emulsion.

N-methylol acrylamide, at 2%, and hydroquinone, at 0.05% (both by weight of copolymer), are added to the copolymer emulsion in the reaction vessel and ultraviolet light is excluded from the vessel and its contents. These constituents are added when the copolymer-forming reaction is completed, and the temperature of the composition is maintained at about 80° C. for 2 hours. The coating composition is allowed cool to ambient temperature and the emulsion filtered through a 100 mesh screen.

The cooled composition is painted onto primed wooden siding boards and placed out of doors to cure in the sunlight. The water and solvent resistance, hardness and adhesion properties of the coating improve with time.

Example 5

Air Cured Indoor Latex Coating

An aqueous emulsion copolymer for indoor use is prepared at about 50% by weight solids as per Example 1 from a monomer emulsion of vinyl acetate and butyl acrylate at a 7 to 3 ratio (weight to weight) along with 5% by weight 2-hydroxyethyl acrylate and 2% N-(dimethylamino)ethyl methacrylamide, the weights being based upon total monomer weight. The emulsion is stabilized by the addition of acetic acid to a pH value of 5.5.

After standard redox initiated emulsion copolymerization, as described in Example 1, 1.5% of N-methylol methacrylamide and 0.05% benzoquinone, both by weight of the dispersed copolymer, are admixed into the copolymer emulsion at a temperature of 80° C. The reaction mixture is maintained at 80° C. for 2 hours, allowed to cool to ambient temperature, and filtered through a 100 mesh screen.

Drier salts are mixed and added to the emulsified copolymer as described in Example 2. This emulsion is painted on primed wall board, and the painted surface allowed to dry. Evaluations indicate that this coating has improved resistance to rubbing with methyl ethyl ketone and with surfactant soaked cloths as the time allowed for cure increases.

Example 6

Air Curing Indoor Coating

An aqueous emulsion copolymer composition for indoor use is prepared at about 50% by weight solids as per Example 1 from a monomer emulsion of vinyl acetate and butyl acrylate at a 6 to 4 ratio (weight to weight) along with 5% by weight isobutoxymethyl acrylamide, based on the total monomer weight.

This copolymer emulsion then has 1.5% of acrylamide and 0.05% benzoquinone (both by weight of copolymer solids) admixed therein at a reaction mixture temperature of 80° C. The adduction reaction is allowed to proceed for two hours, allowed to cool to ambient temperature, and filtered through a 100 mesh screen.

Drier salts are added as described in Example 2, and the resultant composition painted on a primed piece of wall board. Again, improvement in resistance to rubbing with methyl ethyl ketone and with surfactant soaked cloths is noted as cure time increases.

EXAMPLE 7

Air Curing Outdoor Coating

An aqueous emulsion copolymer composition for outdoor surfaces is prepared in a manner similar to that of Example 1 with the exception of the preparation of the monomer emulsion. In this case, 5% by weight of the total monomer charge of a propylene oxide adduct of trimethylolpropane having a molecular weight of about 600 is first emulsified in water using the sodium dodecyl benzene sulfonate. Therefore, sufficient ethyl acrylate and methyl methacrylate to prepare a 50% by weight solids coating are coemulsified at a 2 to 1 ratio by weight.

The copolymerization is then carried out as discussed in Example 1. The post-copolymerization adduction reaction of 1% N-methylol methacrylamide in the presence of 0.05% benzoquinone, both amounts by weight of the copolymer, is also carried out as per Example 1. Drier salts, are then added as per Example 2.

This composition is painted on primed wooden siding boards and allowed to cure out of doors. Resistance to rubbing with surfactant and methyl ethyl ketone soaked cloths improve with the cure time.

Example 8

Light Curing Outdoor Coating

The aqueous emulsion copolymer composition of Example 4 is reprepared. While the copolymer latex is still in the reaction kettle, sufficient formalin (37% by weight formaldehyde in water) is admixed at a temperature of 60° C. to form N-methylol groups on 40% of the copolymerized acrylamide moieties so that about 2% by weight of the copolymer has N-methylol groups.

On formation of the N-methylol groups, methacrylamide and benzoquinone are admixed with the copolymer particles at 1.5% and 0.05% by weight of the copolymer, respectively. The methacrylamide is allowed to react with the N-methylol-functional copolymer particles for 3 hours at a reaction temperature of 60° C. The resulting composition is then allowed to cool to ambient temperature.

This composition is painted on primed wooden siding boards and allowed to cure out of doors in the sunlight. Resistance to rubbing with surfactant and with methyl ethyl ketone soaked cloths improves with the time allowed for cure.

I claim:

1. An air drying latex coating composition which cures under ambient conditions comprising water having dispersed therein aqueous emulsion copolymer particles consisting essentially of copolymerized monoethylenically unsaturated monomers, the copolymer particles of said latex having ethylenic unsaturation provided by the reaction of reactive groups in the copolymer particles with a reactive ethylenically unsaturated monomer bonded thereto through a reacted $C_1$-$C_6$ N-alkylol functionality, said unsaturated monomer which is bonded to the copolymer particles being present in an amount of about 0.5% to about 30% by weight of the copolymer, and a curing catalyst or curing agent incorporated in the latex to cause said unsaturation to react in a deposited coating to cure the same.

2. The air drying latex coating composition of claim 1 wherein said ethylenic unsaturation is provided by the reaction of an ethylenically unsaturated monomer having a single reactive group with reactive groups present in said copolymer particles.

3. The air drying latex coating composition of claim 1 wherein said ethylenic unsaturation is provided by the reaction of copolymerized $C_1$-$C_6$ N-alkylol functional monomer in said copolymer with an ethylenically unsaturated monomer having a single reactive group which reacts with said N-alkylol functionality.

4. The air drying latex coating composition of claim 3 wherein said reactive group in said unsaturated monomer is selected from carboxyl, alcoholic hydroxyl or amide groups.

5. The air drying latex coating composition of claim 3 wherein said copolymerized $C_1$-$C_6$ N-alkylol functional monomer is present in the form of a $C_2$-$C_8$ saturated alcohol ether thereof.

6. The air drying latex coating composition of claim 5 wherein said $C_2$-$C_8$ saturated alcohol ether of said copolymerized $C_1$-$C_6$ N-alkylol functional monomer is an isobutoxy ether of a N-methylol functional monomer.

7. The air drying latex coating composition of claim 1 wherein said ethylenic unsaturation of said latex is provided by the reaction of copolymerized N-isobutoxymethyl functional monomer in said copolymer particle and reactive ethylenically unsaturated amide monomer having two amide hydrogen atoms.

8. The air drying latex coating composition of claim 2 wherein said ethylenic unsaturation is provided by the reaction of an ethylenically unsaturated $C_1$-$C_6$ N-alkylol functional monomer with a reactive group of said copolymer particles selected from the group consisting of alcoholic —OH, —C=OOH, —C=ONH—, =NOH, =N=NH—, =N—NHC=ONH—, the dangling valence of the NH— moiety being nonreactive with N-alkylol functionality, and —C=ONA—OB, wherein A and B of said last listed reactive group are hydrogen or $C_1$-$C_4$ alkyl, at least one of A and B being hydrogen.

9. The air drying latex coating composition of claim 8 wherein said ethylenically unsaturated $C_1$-$C_6$ N-alkylol functional monomer is an N-methylol amide or N-methoxymethylol amide.

10. The air drying latex coating composition of claim 1 wherein said reacted N-alkylol functionality is formed in situ by the reaction of formaldehyde with functionalities provided by both said copolymer particle and said ethylenically unsaturated monomer, said functionalities being selected from the group consisting of —C=ONH—, —C=OOH and alcoholic —OH, and at least one of said reactants having a —C=ONH— functionality.

11. The air drying latex coating composition of claim 10 wherein said functionalities provided by said copolymer particle and said ethylenically unsaturated monomer are both —C=ONH$_2$.

12. The air drying latex coating composition of claim 1 wherein reactive groups selected from alcoholic —OH, —C=OOH, —C=ONH—, =NOH, =N—NH—, =N—NHC=ONH—, or —C=ONA—OB, wherein A and B of said last listed reactive group are hydrogen or $C_1$-$C_4$ alkyl, at least one of A and B being hydrogen, are present in said copolymer particles by the incorporation therein of a water insoluble liquid plasticizer carrying said reactive groups.

13. The air drying latex coating composition of claim 12 wherein said water insoluble liquid plasticizer is a polyalkylene oxide ether or a polyhydric alcohol.

14. An air drying latex coating composition which cures under ambient conditions comprising water having dispersed therein aqueous emulsion copolymer particles consisting essentially of copolymerized monoethylenically unsaturated monomers, said copolymer particles having bonded thereto a plurality of groups having the formula:

$$-X-CH-Y-Z$$
$$\phantom{-X-C}|$$
$$\phantom{-X-C}R$$

wherein

X and Y are selected from —O— or $$-\overset{|}{N}-,$$

at least one of X and Y being $$-\overset{|}{N}-;$$

R is hydrogen or $C_1$-$C_5$ alkyl; and

Z is the residue of an ethylenically unsaturated monomer having a single reactive group other than the ethylenic unsaturation;

said Y and Z together comprising about 0.5% to about 30% by weight of the solids of said copolymer, and a curing catalyst or curing agent incorporated in the latex to cause said unsaturation to react in a deposited coating to cure the same.

15. The air drying latex coating composition of claim 14 wherein R is hydrogen.

16. The air drying latex coating composition of claim 14 wherein both X and Y are —NH—.

17. The air drying latex coating composition of claim 14 wherein Z contains an acryloyl or methacryloyl residue.

18. The air drying latex coating composition of claim 14 wherein Z is the residue of a $C_{10}$-$C_{20}$ ethylenically unsaturated monomer.

19. A method of providing an air drying latex coating composition having ethylenic unsaturation comprising the steps of:

forming an aqueous dispersion of copolymer particles consisting essentially of aqueous emulsion copolymerized monoethylenically unsaturated monomers, said copolymer particles having a plurality of reactive groups selected from the group consisting of alcoholic —OH, —C═OOH, —C═ONH—, ═NOH, ═N—NH—, ═N—NHC═ONH— and —C═ONA—OB, wherein A and B of said last listed reactive group are hydrogen or $C_1$-$C_4$ alkyl, at least one one of A and B being hydrogen;

reacting said copolymer particles with about 0.5% to about 30% by weight of the solids of said copolymer of an ethylenically unsaturated monomer selected from the group consisting of the N-methylol amides of acrylic acid, methacrylic acid, crotonic acid and allyl carbonic acid, and the N-methylol imide of maleic acid to form copolymer particles having a plurality of said ethylenically unsaturated monomers thereon; and admixing a curing catalyst or curing agent into said dispersion to cause said unsaturation to react in a deposited coating to cure the same.

20. The method of claim 19 wherein said plurality of reactive groups are carried by said copolymerized monoethylenically unsaturated monomers.

21. The method of claim 19 wherein said copolymer is additionally comprised of up to about 3% by weight of a copolymerized tertiary amino functional monomer, at least some of said amino groups being protonated.

22. The method of claim 19 wherein said copolymer particle is comprised of carboxylic acid functionality.

23. The method of claim 19 wherein after the reaction with said ethylenically unsaturated monomer, said copolymer particles have bonded thereto a plurality of groups having the structure $$-X-CH_2-Y-Z$$

wherein X and Y are selected from —O— or $$-\overset{|}{N}-,$$

at least one of X and Y being $$-\overset{|}{N}-;$$

and Z is the residue of said ethylenically saturated monomer.

* * * * *

UNITED STATES PATENT OFFICE
CERTIFICATE OF CORRECTION

Patent No. 4,289,675          Dated September 15, 1981

Inventor(s) JOHN J. KRAJEWSKI

It is certified that error appears in the above-identified patent and that said Letters Patent are hereby corrected as shown below:

Column 8, line 63 "dispersing" should read -- dispersion --.

Column 10, line 49 "of" should read -- if --.

Column 13, line 17 "Therefore" should read -- Thereafter --.

Column 15, line 5 "or" should read -- of --.

Signed and Sealed this

Twenty-fifth Day of May 1982

[SEAL]

Attest:

Attesting Officer

GERALD J. MOSSINGHOFF
*Commissioner of Patents and Trademarks*